United States Patent

Arsem

Patent Number: 5,541,593
Date of Patent: Jul. 30, 1996

[54] COMPUTER KEYBOARD

[76] Inventor: A. Donald Arsem, 25 Northledge Dr., Snyder, N.Y. 14226

[21] Appl. No.: 299,244

[22] Filed: Aug. 31, 1994

Related U.S. Application Data

[63] Continuation-in-part of Ser. No. 907,634, Jul. 2, 1992, abandoned.

[51] Int. Cl.⁶ ..................................................... H03K 17/94
[52] U.S. Cl. ............................ 341/22; 400/472; 400/682
[58] Field of Search ........................ 341/22, 20; 400/472, 400/489, 492, 680–682

[56] References Cited

U.S. PATENT DOCUMENTS

| | | | |
|---|---|---|---|
| 4,402,624 | 9/1983 | Stahl et al. | 400/472 X |
| 4,661,005 | 4/1987 | Lahr | 400/682 X |
| 4,693,444 | 9/1987 | Williams | 400/682 X |
| 5,172,100 | 12/1992 | Iino | 340/705 |

OTHER PUBLICATIONS

IBM Technical Disclosure Bulletin vol. 25 No. 4 Sep. 1982.

*Primary Examiner*—John K. Peng
*Assistant Examiner*—Andrew Hill
*Attorney, Agent, or Firm*—Robert M. Wolters

[57] ABSTRACT

A computer keyboard is provided which is mounted for pivoting movement adjacent one of its front and rear edges. The keyboard also may be pivotable about a more or less vertical pivot. One or more cams engage the keyboard for movement thereof either continuously or from time to time. The cams are motor operated or manually operated, and may effect pivotal movement of the keyboard on a continuous basis or on an intermittent basis. In a preferred embodiment a time or counter operates a light/buzzer device to call attention of the operator to the necessity for operating a manual lever to effect movement of the cam to effect movement of the keyboard.

6 Claims, 2 Drawing Sheets

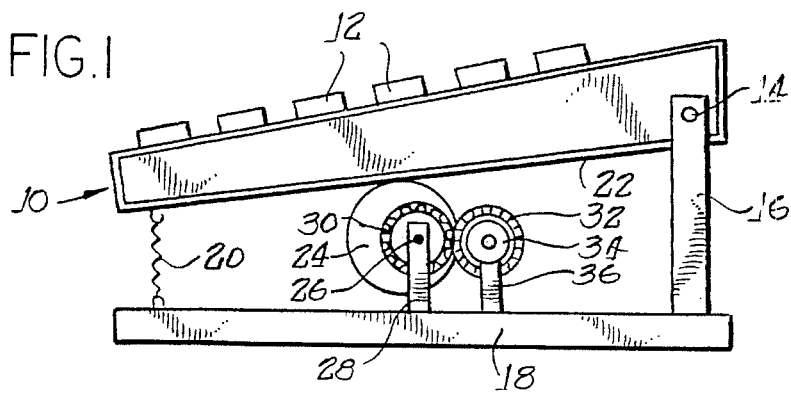
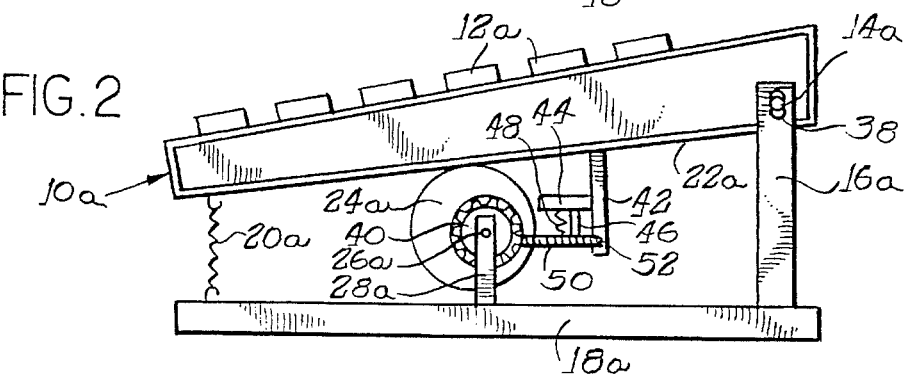
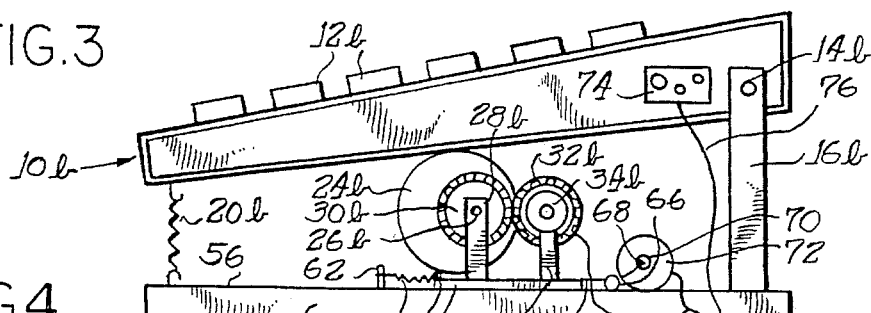
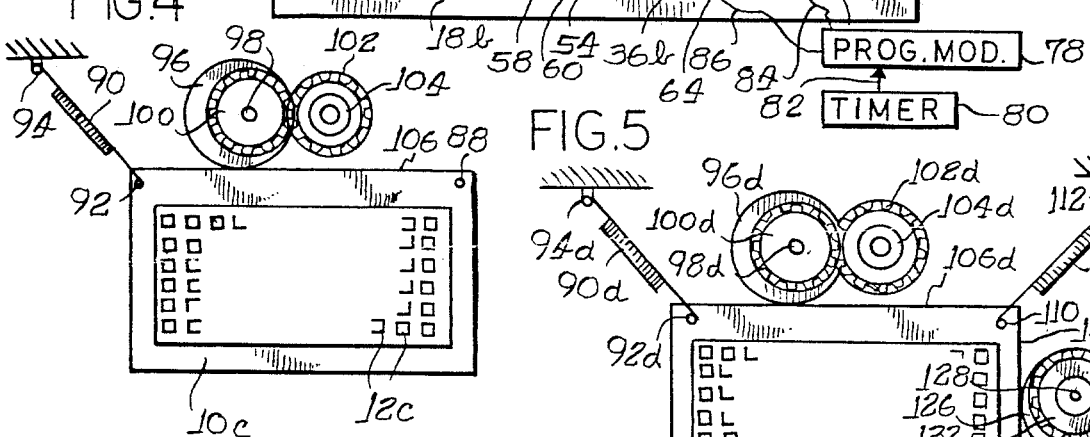
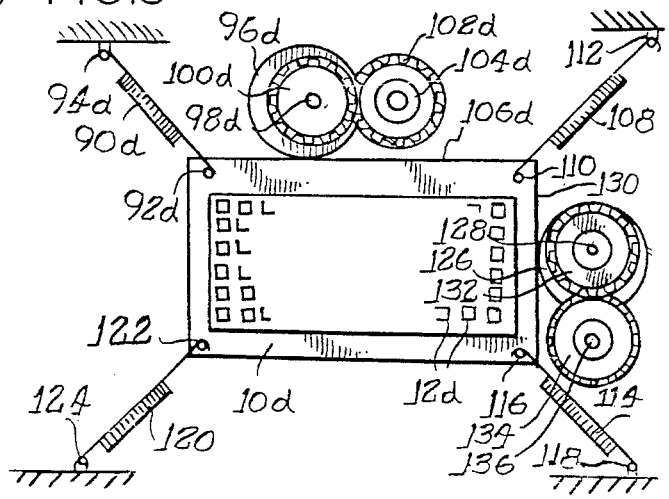

COMPUTER KEYBOARD

This application is a continuation-in-part of application Ser. No. 07/907,634, filed Jul. 2, 1992, abandoned.

BACKGROUND OF THE INVENTION

In recent years attention has been directed by medical personnel and others to muscle and tendon injuries and the like caused by repetitive motion. Often this is brought about in the workplace where continuous repetitive motion is required on an assembly line basis. A person afflicted by such injury suffers pain, discomfort and fatigue. Such injury is not restricted to the assembly line, but can be encountered in any repetitive motion type of activity, including typing on a computer keyboard. Such typing can go on for many hours, without any relief due to necessity of feeding in fresh paper, etc. Indeed, in days of manual typewriters it was necessary to pause at the end of every line, and to operate manually a carriage return. Corrections were made manually, and required pausing, utilizing different muscles.

Repetitive motion of the hands and fingers, whether from a computer, from an assembly line operation, or otherwise requires flexing of the fingers by tendons that run through a structure called the carpal tunnel, a small space between the eight bones of the wrist and the bracelet of ligaments that encircles them. The sensory nerves of the fingers also run through that carpal tunnel. Upon movement of the fingers the tendons slide back and forth beneath the ligament bracelet. Continuous sliding abrades both tendons and ligaments, inflaming them until they press against the nerves that share the tunnel. This causes symptoms including numbness in the fingers and stabs of pain in the wrist that feel like electric shock. Such difficulties have come to be known as "carpal tunnel syndrome" frequently abbreviated as CPS. Related pain symptoms can also be developed in the user's arm or wrist, and are known as "myofascial pain syndrome", also known as MPS. Computer type games also can cause tendonitis and the like.

There are other painful muscular or bodily conditions that can be brought about by leaning one elbow on a table while working, or by leaning a head on one hand while working with the other. Cocking the head to one side, as by holding a telephone to an ear with a shoulder, can develop neck or shoulder pain. Crossed legs while typing can cause muscular or tendon problems.

The present invention is concerned primarily with relief of carpal tunnel syndrome and myofascial pain syndrome as affected by typing on a computer keyboard.

OBJECTS AND SUMMARY OF THE PRESENT INVENTION

It is an object of this invention to provide an improved computer keyboard which avoids or minimizes CPS, MPS, and related symptoms caused by extensive typing on a computer keyboard.

It is a further object of the present invention to provide an improved computer keyboard which moves on a continuous or incremental basis to require the operator to change the manner in which he uses the muscles and tendons of his hands, wrists, and arms without any conscious effort on the operator's part.

Yet a further object of the present invention is to provide an improved computer keyboard which forces the operator to occasionally, i.e. from time to time, to make motions entirely unrelated to the typing motions to relieve the stress of continued repetitive motion.

In achieving the foregoing and other objects there is provided a computer keyboard which is not fixed in position, but which moves either on a continuous basis, or incrementally effectively on a continuous basis to change the angle of the computer keyboard, or the position thereof, thereby requiring the operator unconsciously to change the angle of attack of his fingers on the keyboard, thereby changing muscle usage slightly. Over a period of time the accumulated motion may be substantial, whereby the operator unconsciously makes a rather substantial change in position without even realizing that he is doing it.

In accordance with a further improvement the computer keyboard from time to time forces the operator to make a motion of the hands and wrists entirely unrelated to the typing motion to provide relief from the constantly repeating motion.

In order to bring about the required motion of the keyboard I use one or more eccentric cams which bear on the keyboard, and which are operated continuously or intermittently slowly to change the position of the keyboard. In a preferred embodiment of the invention a lever adjacent one or both top corners of the keyboard must be operated manually to initiate an automatic sequence which effects motion of the relevant cam.

It is common practice for a computer operator when first approaching a keyboard to adjust it to his requirements. The keyboard then remains fixed in the adjusted position. In my present invention there is substantially constant incremental change of position of the keyboard in contrast to such one time adjustment by an operator when first setting down to operate the keyboard followed by constant, unchanging position of the keyboard during operation thereof.

THE DRAWINGS

The present invention will best be understood from the following description when taken in connection with the accompanying drawings wherein:

FIG. 1 is a side view of my improved computer keyboard as electrically operated;

FIG. 2 is a view similar to FIG. 1 but relying on manual operation;

FIG. 3 is a view also similar to FIG. 1, but adding structure for shifting the cam radially to vary its position in effecting tilting of the keyboard;

FIG. 4 is a somewhat schematic top view of a keyboard provided with an eccentric cam to effect pivoting of the keyboard in its own plane about a fixed pivot position;

FIG. 5 is a view similar to FIG. 4, but provided with two cams to effect translation of the keyboard both to and from the operator and laterally thereof;

DETAILED DISCLOSURE OF THE ILLUSTRATED EMBODIMENTS

Figure 6:
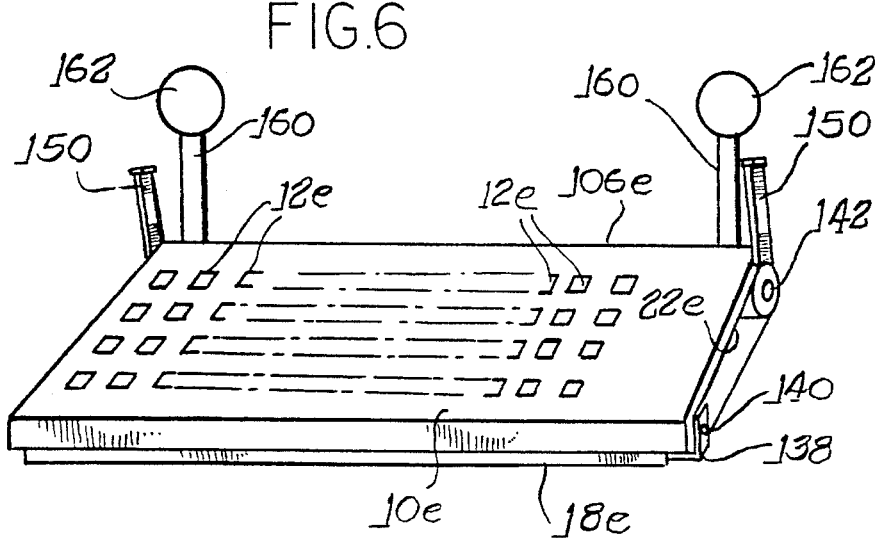
FIG. 6 is a perspective view of a computer keyboard with a modification requiring a completely different motion of the operator's hand from time to time to cause variation in the angle of the keyboard.

Referring first to FIG. 1, there is shown a computer keyboard 10 having the usual plurality of keys 12 thereon. The keyboard is pivoted at its rear end on a pair, of pivots 14 on upstanding posts 16 supported by a bed 18. The keyboard at the edge adjacent the user (the left edge in the drawings) is urged downwardly by a coil spring 20 stretched between suitable spring anchors on the keyboard and on the bed 18. It is contemplated that in many instances gravity will be sufficient, and that the spring 20 would not be necessary. The spring presses the underside 22 of the keyboard down against the cam 24. The cam is illustrated as being a circular cam mounted for rotation about an eccentric pivot 26 carried at the top of a post 28 extending upwardly from the base 18. It will be understood that the cam could be of a shape other then circular to provide a variation in the rate of change of the keyboard position. The cam has a gear 30 fixed to it offcenter of the cam, and also rotatable about the pivot 26. The gear 30 meshes with a gear 32 driven by an electric motor 34 mounted on the top of a post 36 upstanding from the bed 18. In its simplest form, the motor 34 operates at a very slow speed preferably through internal gearing to drive the gear 32 at a very slow speed. The gear 32 in turn rotates the gear 30 at a very slow speed, and this causes the cam 24 to rotate eccentrically, thus pressing upwardly against the underside 22 of the keyboard to move the keyboard very slowly upwardly and downwardly, pivoting about the pivot 14. Thus, the operator of the keyboard engages the keys at a constantly changing position, and the movement of his hands and fingers is not a constantly repeating motion, i.e. it varies with time.

The motor 32 as heretofore referred to is a constantly operating motor, and thereby to vary the position of the keyboard on a continuing basis. Alternatively, the motor 34 can be a stepping motor, whereby the position of the keyboard is varied incrementally. As yet another alternative, referred to hereinafter, the motor 34 can be of a type capable of running continuously, but controlled by a timer.

A modification of the invention is shown in FIG. 2. Most of the parts are the same as in FIG. 1, and similar parts are identified by similar numerals with the addition of the suffix a. A variation is found in that the pins 14a are received in a vertically elongated openings 38 in the posts 16a, to allow a limited amount of up and down motion at the rear or remote end of the keyboard. The important distinction in FIG. 2 is that the cam 24a is fixed to a ratchet wheel 40 for eccentric rotation of the cam about the pivot 26a adjacent the top of the post 28a. A post 42 is fixed to and extends downwardly from the bottom surface 22a of the keyboard rearwardly of the ratchet wheel 40. A support 44 extends frontwardly from the post 42 at a mid position thereof and carries a downwardly extending upstop 46. A spring 48 acting between the support 44 and a pawl 50 which is pivoted at 52 to the post 42 tends to hold the pawl 50 up against the upstop 46. When one of the keys 12a toward the rear portion of the keyboard is pressed, the rear portion of the keyboard moves down slightly by virtue of the pin-in-slot connection 14a, 38, and the pawl 50 presses one of the teeth of the ratchet wheel 40 down, whereby to rotate the ratchet wheel in a clockwise direction about its axis which is coincident with the pivot 26a, and hence to produce eccentric rotation of cam 24a. When the key is released, the keyboard can rock back to its normal position, with the left or forward end of the pawl 50 ratcheting from one tooth to another of the ratchet wheel 40. As will be apparent, the ratchet wheel 40 is on a frictional pivot to prevent inadvertent backward rotation, or is provided with a conventional ratchet mechanism for allowing it to rotate only in a clockwise direction. It will be apparent that the cam 24a and ratchet wheel 40 could be positioned relatively adjacent the front or adjacent edge of the keyboard, to allow almost all of the keys 12a to cause movement of the keyboard as just described.

The pivot pins 14a preferably are resiliently positioned in the slots 38 in which they are received to assure against needless bobbing up and down of the rear or remote edge of the keyboard.

As will now be apparent, whether movement of the keyboard is manual or motor controlled, the movement is substantially continuous in such small increments as not to be consciously noted by the operator and occurs over an extended period of time. Such movement of the keyboard continues as long as the operator continues to operate the keyboard. In these and subsequent embodiments the degree of motion and rate of change are determined by the basic design and not by the operator.

A modification of the mechanism or structure of FIG. 1 is shown in FIG. 3. Again, most of the parts are similar to or the same as those previously described. In this instance, like parts are identified by similar numerals with the addition of the suffix b. Differences reside in that a slide member 64 rests on the upper surface 56 of the base 18b. The slide member may be mounted in a slideway if desired, and is urged to the left by a spring 58 stretched between a suitable spring anchor 60 on the slide 54 and a pin 62 or other anchor on the base. Counteracting the spring 58, there is a flexible cord, cable or the like 64 extending to the right from the right or rear edge of the slide 54, and through an eyelet or guideway 66 to a crank pin 68 on the output shaft 70 (or an enlarged disc thereon) of a motor 72 mounted on the base 18b by conventional means, not shown. Thus operation of the motor 72 will cause the slide 54 to move forwardly or rearwardly on the base 18b, to effect forward and rearward positioning of the cam 24b, and hence to modify the movement of the keyboard 10b produced by rotation of the cam 24b.

In addition to the foregoing, sensors 74 provided on the keyboard can sense user keying characteristics, operating time, user pattern versus time, and other factors as may be desired. The sensors 74 are connected by a cable 76 to a programmed module or controller 78. The programmed module 78 is controlled by a timer 80 connected thereto at 82. The time may run in accordance with time of day from an internal clock or it may be turned on and off along with the computer. The program module is connected by means of cables 84 and 86 to the motors 72 and 34b. Accordingly, the motors 72 and 34b may be controlled to operate on totally different bases, either continuous or intermittent, and concurrently or independently. A more complicated up and down movement of the keyboard 10b, pivoting about the pivot 14b may thus be obtained.

It will be apparent that a less sophisticated movement of the slide 54 could be obtained by use of a solenoid rather than the motor 72. Additional springs or motors, and or solenoids could be provided to move the keyboard from side to side. All degrees of change or freedom are contemplated. It is also possible that the responsive feeling of the keys could be provided on a programmed basis to help relieve fatigue.

A further modification of the invention is shown in FIG. 4 wherein the keyboard is pivotally mounted about a fixed pivot 88, illustrated as being at the remote, right hand corner of the keyboard. A helical spring 90 is stretched between an anchor point 92 adjacent the remote, left corner of the keyboard and a fixed anchor 94. A cam 96, again illustrated as an eccentrically rotating circular cam, rotates about a pivot 98 which is in fixed position on a support which is not shown. A gear 100 also is provided which is fixed to the cam 96 to produce eccentric rotation of the cam. A gear 102 meshes with the gear 100 and is driven by the output shaft of a motor 104 which is mounted in fixed position on the same structure as the pivot 98. This motor again can be a continuously operating motor, or a stepping motor, or one controlled by a timer and programmed module.

In the present instance the cam 96 bears against the remote edge 106 of the keyboard 10c, thereby pivoting the keyboard about the pivot 88. The pivot 88 may be perpendicular to the base (not shown in this instance, but similar to base 18), or it may be perpendicular to the keyboard itself. Movement of the keyboard thus is primarily toward and away from the operator, but there is also some motion laterally of the operator. This may be combined with any of the apparatus shown in FIG. 1 to 3 for moving the keyboard up and down in a pre-programmed sequence, and provides further means for varying the position of the keys, and hence avoiding directly repetitively action of the operator's wrist and fingers.

A further modification of the keyboard of FIG. 4 is shown in FIG. 5. Parts again are similar, and are identified by similar numerals with the addition of the suffix d. The structure is basically the same as that shown in FIG. 4, but the keyboard is entirely spring supported. In addition to the spring 90d at the remote left corner, there is a spring 108 at the remote, right corner of the keyboard 10d which is stretched between an anchor 110 adjacent that corner of the keyboard and a fixed anchor point 112. In addition, there is a spring 114 stretched between an anchor point 116 adjacent the adjacent right corner of the keyboard and a fixed anchor point 118. Similarly, at the front or adjacent, left corner of the keyboard there is a spring 120 stretched between an anchor point 122 on that corner of the keyboard and a fixed anchor point 124. As will be apparent from drawing FIGS. 4 and 5 the mounting springs are all stretched diagonally from the respective corners, although other configurations are contemplated.

In addition, there is a cam 126 pivoted about a fixed pivot 128 and bearing against the right edge 130 of the keyboard. A gear 132 is fixed to the cam 126 for rotation therewith. A gear 134 meshes with the gear 132 in driving relation therewith, and is driven by a motor 136 which is in fixed position. The motor 136 again may be a continuously operating motor, a stepping motor, or a motor controlled by a timer. A more complicated movement of the keyboard thus may be obtained, moving forward and away from the operator, and from left to right of the operator, as well as up and down. This insures a fairly marked changed on a continuous or incremental basis as desired, thus further avoiding strictly repetitive movement of the operator's fingers, hands and wrists.

In each of the preceding embodiments of the invention the keyboard is shifted automatically over a predetermined sequence of positions. In most cases this is effected by an eccentric cam bearing against the underside of the keyboard to move it in a pivotable manner. In FIG. 4 the eccentric cam pivots the keyboard about an upright pivot. In FIG. 5 the movement is again controlled by the eccentric cam, and movement of the keyboard is in the plane of the keyboard. In all cases movement is over a predetermined sequence on a continuous or a stepping basis. The movement is not under the control of the operator.

Figure 7:
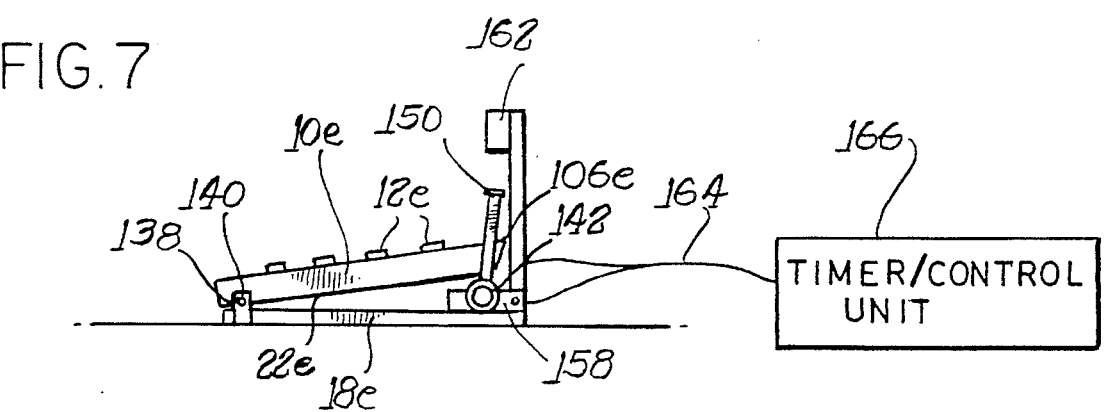
FIG. 7 is an end view of the embodiment of FIG. 6.
Figure 8:
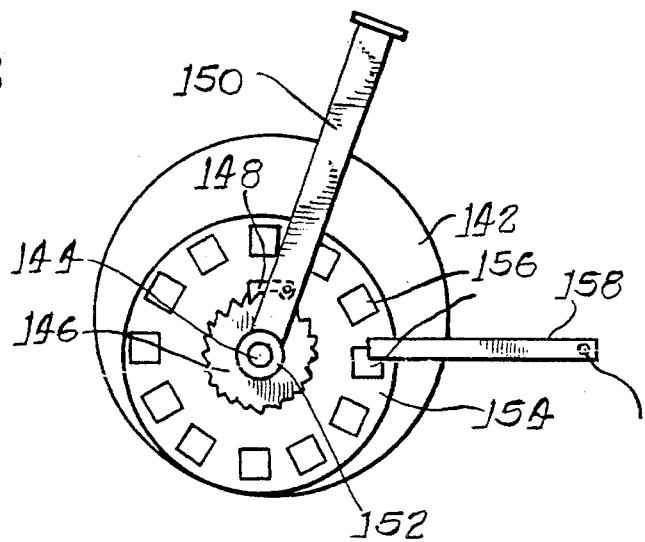
FIG. 8 is a detail of the added structure in FIGS. 6 and 7.

A somewhat different approach is found in the embodiments illustrated in FIGS. 6–8. The keyboard remains as before, being identified at 10e, with the keys at 12e. In this instance the keyboard is pivoted near the front or adjacent edge by means of upstanding supports 138 from the base 18e and pivot pins 140.

In this embodiment of the invention a pair of axially spaced cams or an elongated cam or shaft 142 extends from one side of the keyboard to the other, bearing against the underside 22e thereof, near the rear or remote eddie 106e. The cam 142 is cylindrical, and is fixed on a shaft 144 (the shaft 144 may comprise pins extending from either end of the cam 142 as integral parts thereof) eccentric relative to the cam 142. A ratchet wheel 146 is mounted at either end of the cam, being fixed to the shaft 144. Each ratchet wheel is operated by a respective pawl 148 on a hand lever 150 pivotably mounted on the shaft 144 as by means of a collar 152 at the base of the hand lever.

Also fixed to the shaft at only one end thereof is an insulating circular disc 154 bearing a plurality of contact patches 156 thereon which are respectively engagable by a fixed contact 158 as the disc 154 turns with the cam 142. It will be observed that the disc 154, and specifically the contact patches 156 thereon, are concentric relative to the shaft 144.

A pair of upright supports upstand from the base 18e just beyond the rear or remote edge 106e of the keyboard, and relatively toward the longitudinal or side edges thereof. Light/buzzer units 162 are fixed to the uprights 160 near the upper end thereof. The light/buzzer units 162, the contact patches 156, and the fixed contact 158 are all connected by means of the wires of a cable 164 to a timer/control unit 166.

The timer/control unit 166 may operate strictly on a time basis from an internal clock, or it may be connected to the keys 12e to count the number of pulses. After a predetermined time or a predetermined number of pulses, the timer/control unit 166 disables the key data input and causes the light/buzzer units to buzz and to become illuminated. No further computer typing can be done until the operator grasps one of the hand levers 150 and pulls it toward him to turn the insulating disc 154 to bring a succeeding contact patch 156 into engagement with the fixed contact 158, thereby re-enabling the keyboard (the key data input), and turning off the light/buzzer units 162. Preferably the light/buzzer units 162 are operated alternatively, so that the operator in one instance will have to grab the right hand lever 150 with his right hand, and in another instance he will have to grasp the left hand level 150 with his left hand. This requirement of a different physical action by the operator insures that he will break the repetitive motion, and use a different motion, and simultaneously rest from typing, thereby relieving stress from repetitive motion. At the same time the angular position of the keyboard will be varied by the elongated eccentric cylindrical cam 142, so that when the operator returns to typing on the keyboard he will be engaging the keys at a slightly different angle. Instead of the pawl 148 and ratchet 146 to operate the cam 142, the lever 150 could operate a switch to pulse an electric motor to turn the cam 142 a very short distance. In the last preceding embodiment of the invention timing is the critical factor. Either a clock or the timing itself determines the time. After the expiration of a predetermined time, operations come to a halt until the typist moves one of the levers 150 to reactivate operation. In this example the typist is called on to do something different (which is itself beneficial) to reactivate operation. In this sense, control of sequencing is not under control of the typist, and is determined by a time clock, which may be independent, or is under the control of the typist, and varies with the speed of typing. In this sense it is a variable time clock, but it is not under the conscious control of the typist. The typist may operate the lever ahead of schedule, but the basic timing of the system depends on the clock or counter, and is thus not under conscious acts of the typist.

It will now be apparent that I have disclosed various embodiments of my invention which resides in repositioning a computer keyboard either on a continuous or incremental basis to relieve the stress of repetitive motion. Keyboard movement is generally of such small magnitude that the operator is not consciously aware of the movement. The stress is best relieved with the embodiment illustrated in FIGS. 6–8, since this requires him to take a quite different action than what he has been doing, and also to take a short break from what he has been doing.

The degree of motion and the rate of change as a fraction of time is predetermined to maximize the relief from carpal tunnel syndrome and myofascial pain syndrome or other body stresses caused by extensive use of a computer keyboard or other input device.

In the following claims where reference is made to effecting a predetermined sequence of position of the keyboard it is to be understood that this covers continuous or intermittent change which can be manually or mechanically (f.i., motor) driven on a random or repetitive basis over a period of time that may be extensive.

The specific embodiments are for illustrative purposes only. Those skilled in the art will undoubtedly make further changes which will be understood as coming within the scope of the present invention insofar as they fall within the spirit and scope of the appended claims.

The invention is claimed as follows:

1. Keyboard structure for a computer comprising a keyboard having a plurality of manually actuable keys, means pivotably mounting said keyboard for movement over a predetermined sequence of positions and for effecting pivotable movement of said keyboard over a predetermined sequence of positions over a period of time, said means for moving and pivoting comprising an eccentric cam bearing against said keyboard and means for driving said cam automatically on a continuous or incremental basis and causing said keyboard to pivot, changing the inclination of said keyboard, said sequence not being determined by choice of a user of said keyboard.

2. Keyboard structure as set forth in claim 1 and further including control means connected to the keys of said keyboard for detecting operation of said keys, and means connecting said means for moving and pivoting to the means operatively connected to said keyboard to effect a change in keyboard position upon detection of a predetermined number of key operations.

3. Keyboard structure as set forth in claim 1 wherein the means for driving the cam comprises a mechanical connection between certain keys of said keyboard and said cam.

4. Keyboard structure for a computer keyboard having a plurality of peripheral edges comprising a keyboard having a plurality of manually actuable keys, means mounting said keyboard for movement over a predetermined sequence of positions, an eccentric cam bearing against on of said edges, and motor means for driving said cam automatically on a continuous or intermittent basis to move said keyboard over a period of time.

5. A keyboard structure as set forth in claim 4 further comprising a second cam engaging a second adjacent edge of said keyboard, and motor means for driving said second cam to move said keyboard over a period of time.

6. Keyboard structure for a computer comprising a keyboard having a plurality of manually operable keys, means movably supporting said keyboard for movement over a sequence of position, means operatively connected to said keyboard for effecting movement of said keyboard over a predetermined sequence of positions of said keyboard over a period of time, said means for effecting movement of said keyboard comprising manually operable means, and signalling means perceptible by human senses for occasionally calling attention to an operator to alert said operator to operate said manually operable means, cam means engaging said keyboard and operable by said manually operable means, said manually operable means comprising a lever, means for disabling the key data input, and means for operating said disabling means and said signalling means over a period of time, and means connected to said manually operable means to to restore said key data input and said human perceptible means.

* * * * *